US008320078B1

(12) United States Patent
Zeltser et al.

(10) Patent No.: US 8,320,078 B1
(45) Date of Patent: Nov. 27, 2012

(54) PERPENDICULAR MAGNETIC RECORDING WRITE HEAD WITH ANTIPARALLEL-COUPLED LAMINATED MAIN POLE HAVING A TAPERED TRAILING EDGE

(75) Inventors: Alexander M. Zeltser, San Jose, CA (US); Stefan Maat, San Jose, CA (US); Wen-Chien David Hsiao, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 13/408,213

(22) Filed: Feb. 29, 2012

(51) Int. Cl.
G11B 5/31 (2006.01)
(52) U.S. Cl. .................................. 360/125.12
(58) Field of Classification Search ............. 360/125.03, 360/125.08, 125.09, 125.12, 125.13, 125.19, 360/125.24, 125.26, 125.45, 125.46, 125.5, 360/125.51, 125.58
See application file for complete search history.

(56) References Cited

U.S. PATENT DOCUMENTS

| | | | | |
|---|---|---|---|---|
| 6,259,583 | B1 * | 7/2001 | Fontana et al. | 360/125.5 |
| 6,891,697 | B2 * | 5/2005 | Nakamura et al. | 360/125.12 |
| 7,061,719 | B2 * | 6/2006 | Matono et al. | 360/125.51 |
| 7,064,924 | B2 | 6/2006 | Ju et al. | |
| 7,159,302 | B2 * | 1/2007 | Feldbaum et al. | 29/603.12 |
| 7,382,574 | B2 | 6/2008 | Li et al. | |
| 7,777,989 | B2 | 8/2010 | Sun et al. | |
| 7,889,456 | B2 * | 2/2011 | Jiang et al. | 360/125.08 |
| 7,911,737 | B1 | 3/2011 | Jiang et al. | |
| 7,924,528 | B2 * | 4/2011 | Sasaki et al. | 360/125.15 |
| 8,139,321 | B2 * | 3/2012 | Zeltser et al. | 360/125.12 |
| 2004/0120074 | A1 * | 6/2004 | Okada et al. | 360/126 |
| 2004/0252415 | A1 * | 12/2004 | Shukh et al. | 360/317 |
| 2007/0230044 | A1 * | 10/2007 | Han et al. | 360/125 |
| 2011/0249365 | A1 | 10/2011 | Zeltser et al. | |

OTHER PUBLICATIONS

Okada et al., "Magnetic Properties of FeCo Multilayered Films for Single Pole Heads", IEEE Transactions on Magnetics, vol. 40, No. 4, Jul. 2004, pp. 2368-2370.

* cited by examiner

Primary Examiner — Angel A. Castro
(74) Attorney, Agent, or Firm — Thomas R. Berthold (57) ABSTRACT

A perpendicular magnetic recording write head has an improved antiparallel-coupled laminated main pole (MP) with a tapered trailing edge. The laminated MP has three ferromagnetic layers and two non-magnetic antiparallel-coupling (APC) layers. A first ferromagnetic layer (FM1) has a thickness T1 and a planar end face at the air-bearing surface (ABS). A second ferromagnetic layer (FM2) has a total thickness T2 and includes a first portion with a thickness T4 that has an end face coplanar with the end face of FM1 and a second portion with a tapered end face. A first APC layer separates FM1 and FM2. A third ferromagnetic layer (FM3) has a thickness T3 and a tapered end face that is coplanar with the tapered end face of FM2. A second APC layer separates FM2 and FM3. The net flux is minimized at both the ABS and at MP cross-sections recessed from the ABS.

20 Claims, 8 Drawing Sheets

PERPENDICULAR MAGNETIC RECORDING WRITE HEAD WITH ANTIPARALLEL-COUPLED LAMINATED MAIN POLE HAVING A TAPERED TRAILING EDGE

BACKGROUND OF THE INVENTION

1. Field of the Invention

This invention relates generally to perpendicular magnetic recording systems, and more particularly to perpendicular magnetic recording write heads for use in magnetic recording disk drives.

2. Description of the Related Art

In a perpendicular magnetic recording system like a magnetic recording hard disk drive, the recorded bits are stored in a perpendicular or out-of-plane orientation in the recording layer. The recording or write head in perpendicular magnetic recording disk drives includes a write pole comprising a shaped pole and a main pole for writing to the recording layer, and one or more return poles for return of magnetic flux from the recording layer.

The main pole is typically formed of high moment magnetic materials, the most common example being iron-cobalt (FeCo) alloys. One of the problems with the high-moment main pole is "erase-after-write", i.e., the undesirable erasure of information after writing. This is due to the high-moment main pole having a high remanent magnetization or remanence, i.e., the magnetization that remains after the magnetic field is removed.

It is known that remanence can be reduced by forming the main pole as a lamination of multiple magnetic layers. One common lamination approach is the use of an antiferromagnetically coupling (AFC) layer between two magnetic layers. The two antiferromagnetically-coupled magnetic layers have antiparallel magnetizations that substantially cancel each other in the absence of a magnetic field. This results in low main pole remanence and essentially no net magnetic flux at the end that faces the disk, i.e., the air-bearing surface (ABS) of the slider that supports the write head. Antiferromagnetically-coupled laminated main poles have been described with Ru and Cr AFC layers between FeCo and NiFe layers (U.S. Pat. No. 7,057,853; U.S. Pat. No. 7,159,302; U.S. Pat. No. 7,436,629; and U.S. Pat. No. 7,656,611).

In addition to low remanence, the main pole should also have high magnetic permeability for quick response. Generally the magnetic permeability ($\mu$) is defined as $\mu=dB/dH$ where B is the magnetic flux and H is the applied magnetic field. The initial permeability is a measure of the ability of the write pole to respond to external magnetic fields as those generated by the write current flowing through the write coil. However, a disadvantage of the laminated main pole with antiferromagnetically-coupled FeCo layers is increased saturation field, and thus decreased permeability.

Another common lamination approach is the use of a non-magnetic layer like NiCr or $Al_2O_3$ between two magnetic layers to induce magnetostatic antiparallel coupling (APC) between the two magnetic layers. Thus in the quiescent state (when the write current is off) the moments of the two magnetic layers are antiparallel so there is essentially no net magnetic flux at the end that faces the disk. The antiparallel coupling strength due to insertion of a non-magnetic APC layer is generally weaker than that due to insertion of an AFC layer, and thus higher permeability or lower saturation field, or shorter rise time to saturation can be achieved in a laminated main pole with a non-magnetic APC layer.

It may be desirable for the main pole (MP) to have a tapered trailing edge, i.e., a surface that tapers away from the end that faces the disk. To achieve low remanence for a tapered design, magnetization of the MP needs to be balanced both at the face of the MP that faces the disk and in the regions of the MP recessed from the disk so that there is no net flux emerging from the MP when the write field is off. However, this cannot be achieved with conventional lamination because of the different cross-sectional areas of the end portion of the MP that faces disk and the portion of the MP that is recessed away from the end portion.

What is needed is a perpendicular magnetic recording write head having a laminated main pole with a tapered trailing edge that has low remanence.

SUMMARY OF THE INVENTION

This invention relates to a write head with an improved antiparallel-coupled laminated main pole (MP) that has a tapered trailing edge. The laminated MP has three ferromagnetic layers and two non-magnetic antiparallel-coupling (APC) layers. A first ferromagnetic layer (FM1) has a thickness T1 and a planar end face at the air-bearing surface (ABS). A second ferromagnetic layer (FM2) has a total thickness T2 and includes a first portion with a thickness T4 that has an end face coplanar with the end face of FM1 and a second portion with a tapered end face. A first APC layer separates FM1 and FM2. A third ferromagnetic layer (FM3) has a thickness T3 and a tapered end face that is coplanar with the tapered end face of FM2. A second APC layer separates FM2 and FM3. The use of only three FM layers and two APC layers, wherein FM2 has both an end portion at the ABS and a tapered end portion, allows the net flux to be minimized at both the ABS and at MP cross-sections recessed from the ABS. This is accomplished by appropriate selection of the thicknesses, e.g., the ratio T4/T1, to minimize the pole erasure field at both the ABS and at regions recessed from the ABS.

For a fuller understanding of the nature and advantages of the present invention, reference should be made to the following detailed description taken together with the accompanying figures.

DETAILED DESCRIPTION OF THE INVENTION

Figure 1:
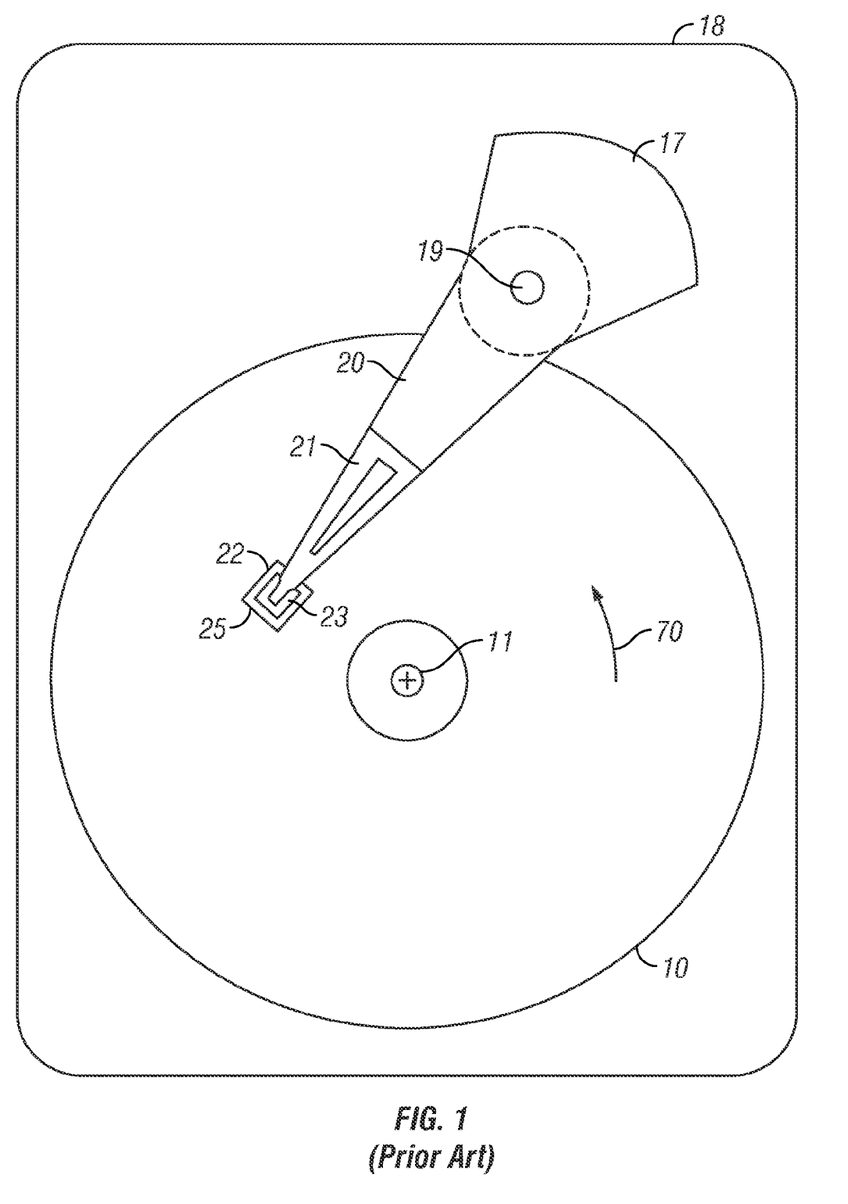
FIG. 1 is a schematic top view of a conventional magnetic recording hard disk drive with the cover removed.

FIG. 1 is a block diagram of a conventional magnetic recording hard disk drive with the cover removed. The disk drive includes a magnetic recording disk 10 and a rotary voice coil motor (VCM) actuator 17 supported on a disk drive housing or base 18. The disk 10 has a magnetic recording layer (RL) with generally concentric data tracks. The disk 10 has a center of rotation 11 and is rotated in direction 70 by a spindle motor (not shown) mounted to base 18. The actuator 17 pivots about axis 19 and includes a rigid actuator arm 20. A generally flexible suspension 21 includes a flexure element 23 and is attached to the end of arm 20. A head carrier or air-bearing slider 22 is attached to the flexure 23. A magnetic recording read/write head (not shown) is formed on the trailing surface 25 of slider 22. The flexure 23 and suspension 20 enable the slider to "pitch" and "roll" on an air-bearing generated by the rotating disk 10. Typically, there are multiple disks stacked on a hub that is rotated by the spindle motor, with a separate slider and read/write head associated with each disk surface.

Figure 2A:
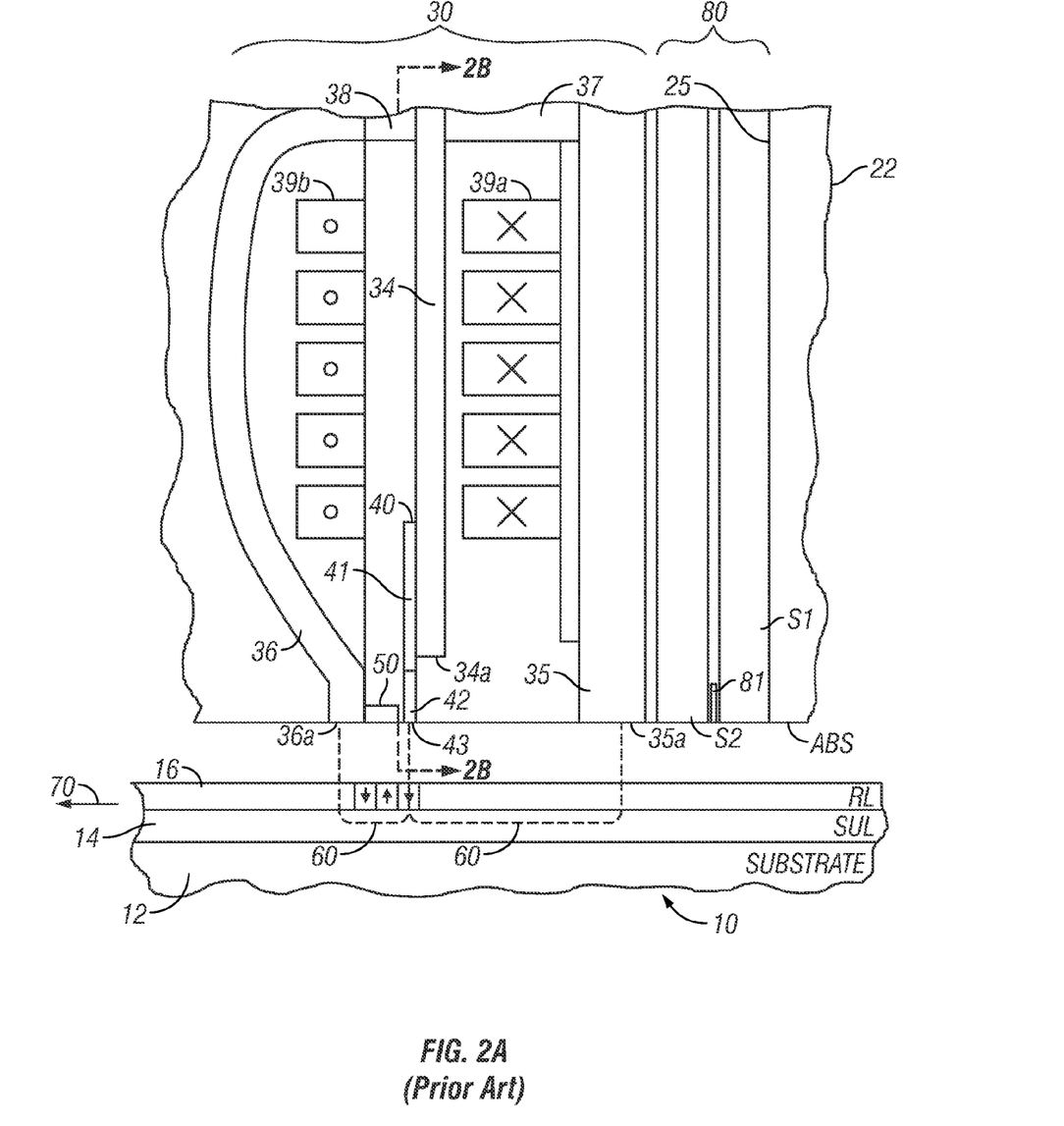
FIG. 2A is a side sectional view of a prior art perpendicular magnetic recording system showing a read head, a write head, and a recording medium taken through a plane parallel to a data track.

FIG. 2A is a side sectional view of a portion of the slider 22 showing a read head 80, a write head 30, and the recording medium (disk 10) with RL 16 taken through a plane parallel to a data track. As shown in FIG. 2A, a "dual-layer" medium 10 includes a perpendicular magnetic data recording layer (RL) 16 on a "soft" or relatively low-coercivity magnetically permeable underlayer (SUL) 14 formed on the disk substrate 12. This type of medium is shown with a magnetoresistive (MR) read head 80 and a single pole type of recording or write head 30 that are shown in a section taken through a plane parallel with a data track on RL 16. The MR read head 80 includes the MR sensor 81 located between MR shields S1, S2.

The write head 30 includes a yoke made up of the shaped pole 34, also referred to as P2, a first flux return pole 35, also referred to as P1, a yoke stud 37 connecting the shaped pole 34 and first return pole 35, a second flux return pole 36, also referred to as P3, a yoke stud 38 connecting the shaped pole 34 and second flux return pole 36, and a thin film coil 39a, 39b shown in section around shaped pole 34. The coil 39a, 39b is depicted as a helical coil wrapped around shaped pole 34, but the coil may also be a well-known "pancake" coil wherein the coil is wrapped around the yoke and the coil segments lie in substantially the same plane. A flared main-pole (MP) 40 is formed over the shaped pole 34 and has a flared portion 41 and a pole tip portion 42 with a pole tip end 43 that faces the outer surface of disk 10. Write current through coil 39a, 39b induces a magnetic field (shown by dashed line 60) from the MP 40 that passes through the RL 16 to write to the RL 16 by magnetizing the region of the RL 16 beneath the MP 40. The magnetic field 60 is directed from the RL 16 through the flux return path provided by the SUL 14, and back to the flux return poles 35, 36. The read head 80 and write head 30 are formed as a series of films deposited on the trailing surface 25 of slider 22. Slider 22 has an air-bearing surface (ABS) that faces the disk 10. The pole tip end 43 is located substantially at the ABS, and the first and second return poles, 35, 36 have ends 35a, 36a, respectively, that are located substantially at the ABS and thus generally coplanar with pole tip end 43. The shaped pole 34, on which MP 40 is formed, has an end 34a that is recessed from the ABS. In FIG. 2A the disk 10 moves past the recording head in the direction indicated by arrow 70. The RL 16 is illustrated with perpendicularly recorded or magnetized regions, with adjacent regions having opposite magnetization directions, as represented by the arrows. The magnetic transitions between adjacent oppositely directed magnetized regions are detectable as resistance changes by the MR sensor 81 as the recorded bits. FIG. 2A also illustrates an optional trailing shield (TS) 50 that forms part of a "wraparound" shield that is described in more detail in FIG. 2C.

Figure 2B:
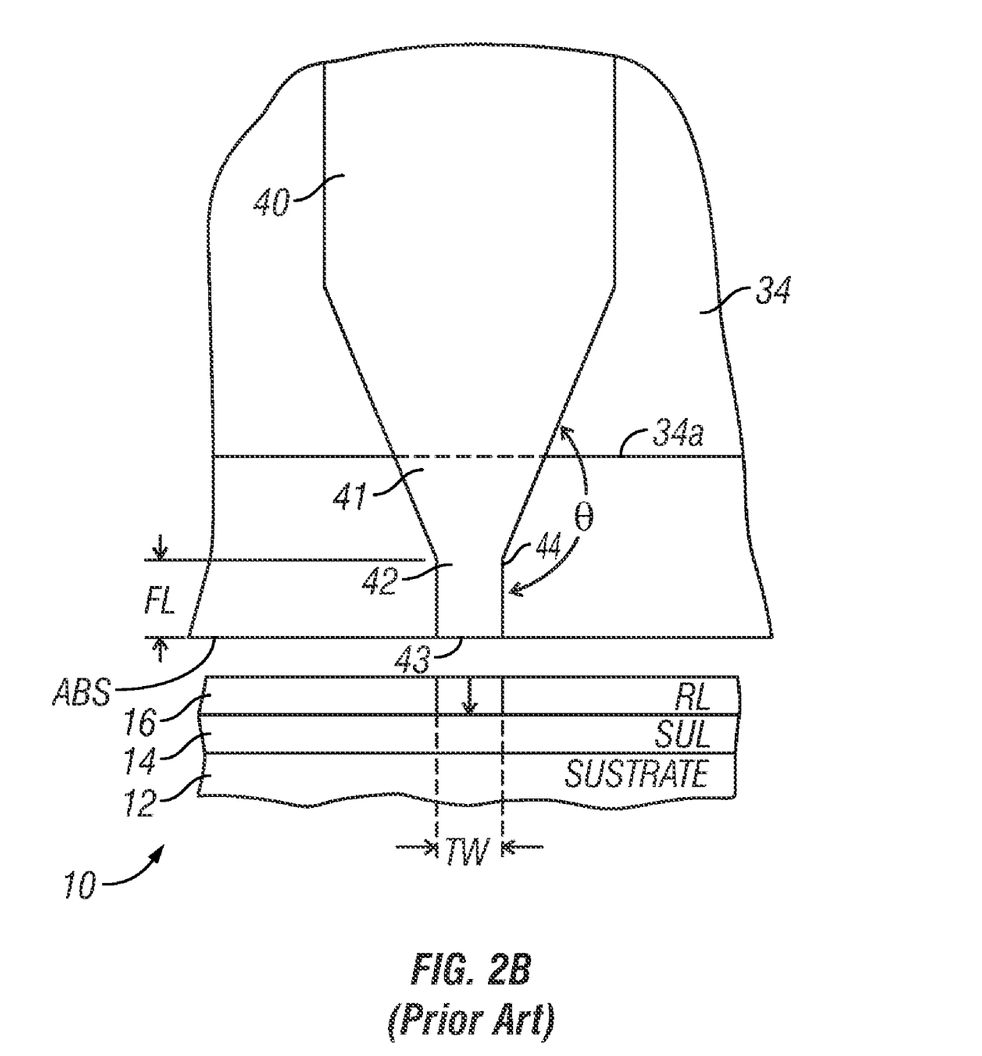
FIG. 2B is a view in the direction 2B-2B of FIG. 2A and illustrates the width of the main pole (MP) to substantially define the trackwidth (TW) of the data recorded in the recording layer (RL).

FIG. 2B is a view in the direction 2B-2B of FIG. 2A. FIG. 2B shows a shaped pole 34 which serves as the substrate for the MP 40. Shaped pole 34 has its end 34a recessed from the ABS, and better illustrates the flare region 41 of flared MP 40. The region between the pole tip portion 42 and the flare portion 41 is called the flare point 44. The flare point 44 of the MP 40 is sometimes referred to as the "choke" point because it is the point where the flux density is highest and where the MP 40 saturates. The MP tip 42 has a "height" from end 43 to flare point 44 called the flare length (FL). As shown in FIG. 2B, the two side walls of MP tip 42 define its width in the cross-track direction, which substantially defines the track-width (TW) of the data recorded in the RL 16. The region of the MP 40 above the flare region 41 is substantially wider than MP tip 42 below the flare region 41 and the flare point 44 is the transition point where the MP 40 begins to widen with distance from the ABS. The angle θ in FIG. 2B is called the flare angle and is between 90 and 180 degrees, typically between about 120 and 150 degrees.

Figure 2C:
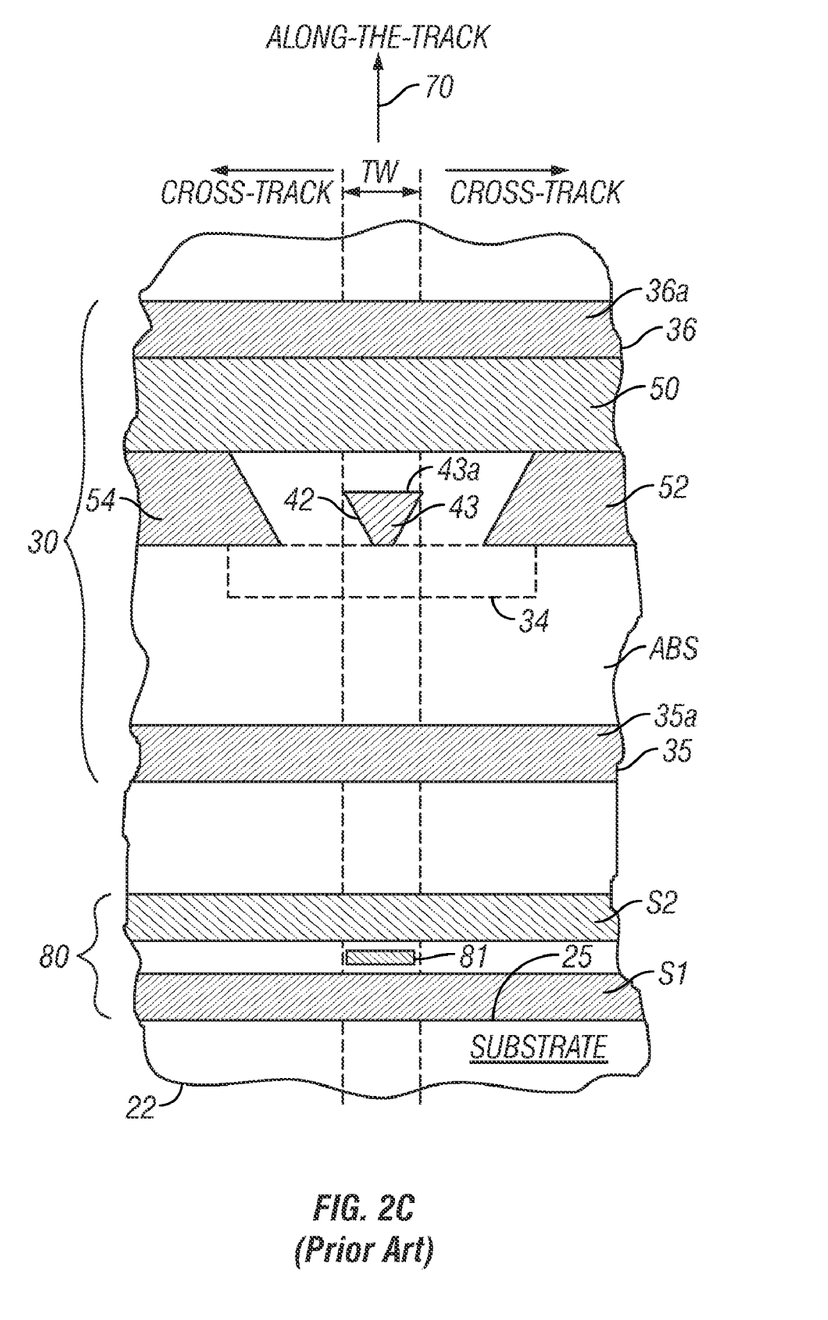
FIG. 2C is a view from the air-bearing surface (ABS) of the prior art write head in FIG. 2A and shows a wraparound shield substantially surrounding the main pole tip and connected to the return pole.

FIG. 2C illustrates the write head 30 as seen from the disk 10. The ABS is the recording-layer-facing surface of the slider 22 that faces the medium 10 and is shown in FIG. 2C without the thin protective overcoat typically present in an actual slider. The recording-layer-facing surface shall mean the surface of the slider or head carrier that is covered with a thin protective overcoat, the actual outer surface of the head carrier if there is no overcoat, or the outer surface of the overcoat. The phrase "substantially at the recording-layer-facing surface" shall mean actually at the surface or slightly recessed from the surface. The disk 10 moves relative to the write head 30 in the direction 70, which is called the along-the-track direction. The dashed lines in FIG. 2C represent the sides of a data track. The width of the end 43 of main pole tip 42 substantially defines the track-width (TW) of the data tracks in the RL 16. The main pole tip 42 has a generally trapezoidal shape with a trailing edge 43a as a result of the manufacturing process. The shaped pole 34 is shown with dashed lines because it is recessed from the ABS. The direction perpendicular to direction 70 and parallel to the plane of the ABS is called the cross-track direction.

The wraparound shield that includes side shields 52, 54 and TS 50 is described in detail as a shield for a conventional perpendicular recording head in U.S. Pat. No. 7,002,775 B2 assigned to the same assignee as this application. The shields 50, 52, 54 all have ends substantially at the recording-layer-facing surface. The shields 50, 52, 54 are typically connected to one another and substantially surround the MP tip 42 to from a "wraparound" shield. The TS 50 and side shields 52, 54 are separated from MP tip 42 by nonmagnetic gap material, typically alumina. The wraparound shield with shields 50, 52, 54 separated from the MP tip 42 by nonmagnetic gap material alters the angle of the write field and improves the write field gradient at the point of writing, and also shields the RL from the writing field at regions away from the track being written. The wraparound shield is shown as being connected to the return pole 36 but it may also be a "floating" shield, meaning that it is not connected to either the return pole 36 or other portions of the yoke by flux-conducting material. In other variations of the write head 30, instead of a wraparound shield only a TS without side shields may be used. The TS may be either "floating" or connected to return pole 36. A perpendicular magnetic recording write head with a TS and a process for making it is described in US 2006215314 A1, assigned to the same assignee as this application. The yoke and shields of write head 30 are formed of soft ferromagnetic material, such as alloys of NiFe, CoFe and NiFeCo that are typically formed by electroplating. The shaped pole 34 is formed of a high-moment material, such as a high-moment FeCo alloy.

FIG. 2C also illustrates the magnetoresistive (MR) read head 80 that includes the MR sensor 81 located between MR shields S1, S2. The films making up MR head 80 and write head 30 as shown in FIG. 2C are formed in succession on a substrate by a series of thin film deposition, etching and lithographic patterning process steps.

Figure 3:
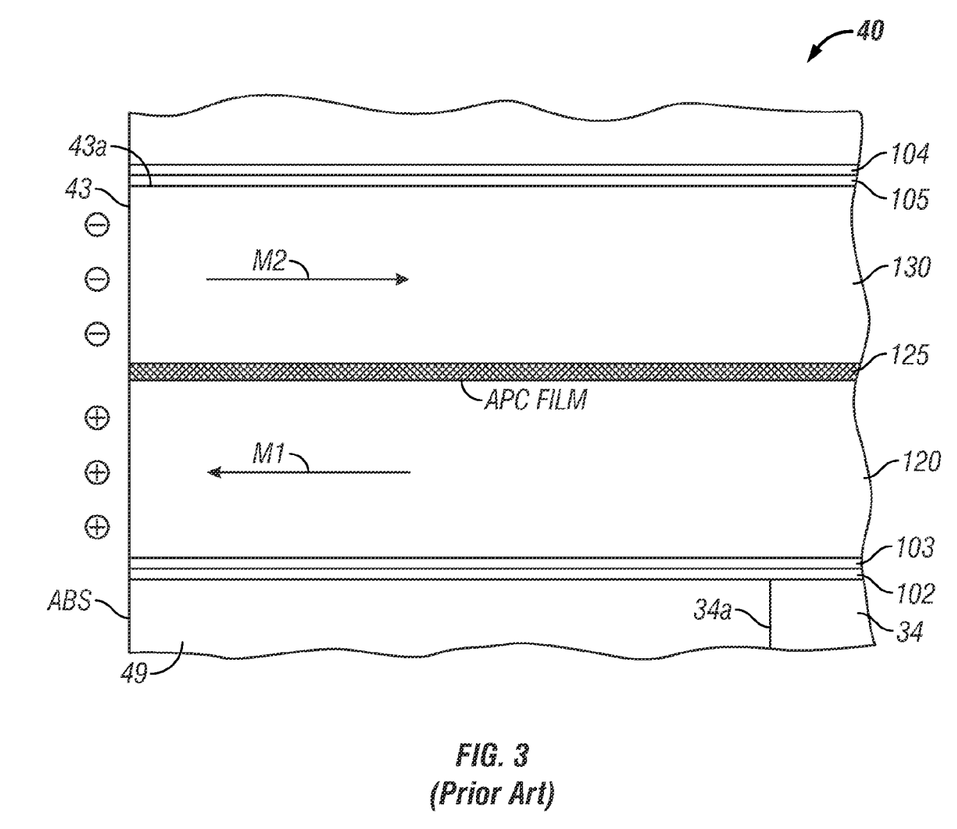
FIG. 3 is an enlarged sectional view of a prior art antiparallel-coupled laminated MP.

FIG. 3 is an enlarged sectional view of a prior art antiparallel-coupled laminated MP 40 which is formed over a portion of the shaped pole 34. The MP 40 has a pole tip end 43 and trailing edge 43a at the ABS. The shaped pole 34 is typically electroplated through a photomask followed by removal of the mask, deposition of insulating non-magnetic material, like alumina ($Al_2O_3$), and planarization by chemical mechanical polishing (CMP) to form a substrate that comprises a portion of shaped pole material 34 and a portion of alumina 49. The layers of the laminated MP 40 are then sputter deposited as full films onto the so-formed substrate, a portion 49 of which is alumina and another portion of which is the material of shaped pole 34. After deposition of all the layers making up the laminated MP 40, the laminated layers are processed by a series of photo-lithographical and ion milling steps to form the MP 40 of the desired shape with flared portion 41 and a pole tip 42 (FIG. 2A). ABS lapping removes a portion of the pole tip, defining the ABS at the end of the pole tip 43. The end 34a of shaped pole 34 is recessed from the ABS. The recession is typically in the range of about 1000 to 2000 nm depending on design. An exemplary shape of a finished write head of the prior art is shown in FIGS. 2A-2C. The MP 40 includes a lower seed layer 102, such as a Ru or NiCr alloy layer, a NiCr/NiFe alloy bilayer, or a Ru/NiCr alloy bilayer on the substrate and a bottom NiFe layer 103 on seed layer 102. The MP 40 also includes an upper capping layer 104, such as a NiCr alloy, and a top NiFe layer 105 just below the capping layer 104. The MP 40 includes an APC layer 125, formed of non-magnetic material like NiCr or $Al_2O_3$, that couples two ferromagnetic layers 120, 130 located on the opposite sides of the APC layer 125. Each ferromagnetic layer 120, 130 is a relatively thick high-moment FeCo layers. The APC layer 125 induces magnetostatic antiparallel coupling between the two ferromagnetic layers 120, 130 on opposite sides of the APC layer 125 so that in the quiescent state their respective moments M1, M2 are antiparallel. The easy axis directions of the layers are substantially parallel to the ABS when the write field is off. As the write field is switched on the magnetizations of both layers rotate away from being parallel to the ABS, giving rise to a flux that emerges from the MP at the ABS and writes bits on the RL. In this example the ferromagnetic layers 120, 130 have substantially the same composition, so M1 and M2 are equal, and substantially the same cross-sectional areas. Thus there is essentially no net magnetic flux at the ABS and low remanence of the MP 40. A prior art perpendicular write head with an antiparallel-coupled laminated MP like that shown in FIG. 3 is described in U.S. Pat. No. 7,064,924 B2.

Figure 4:
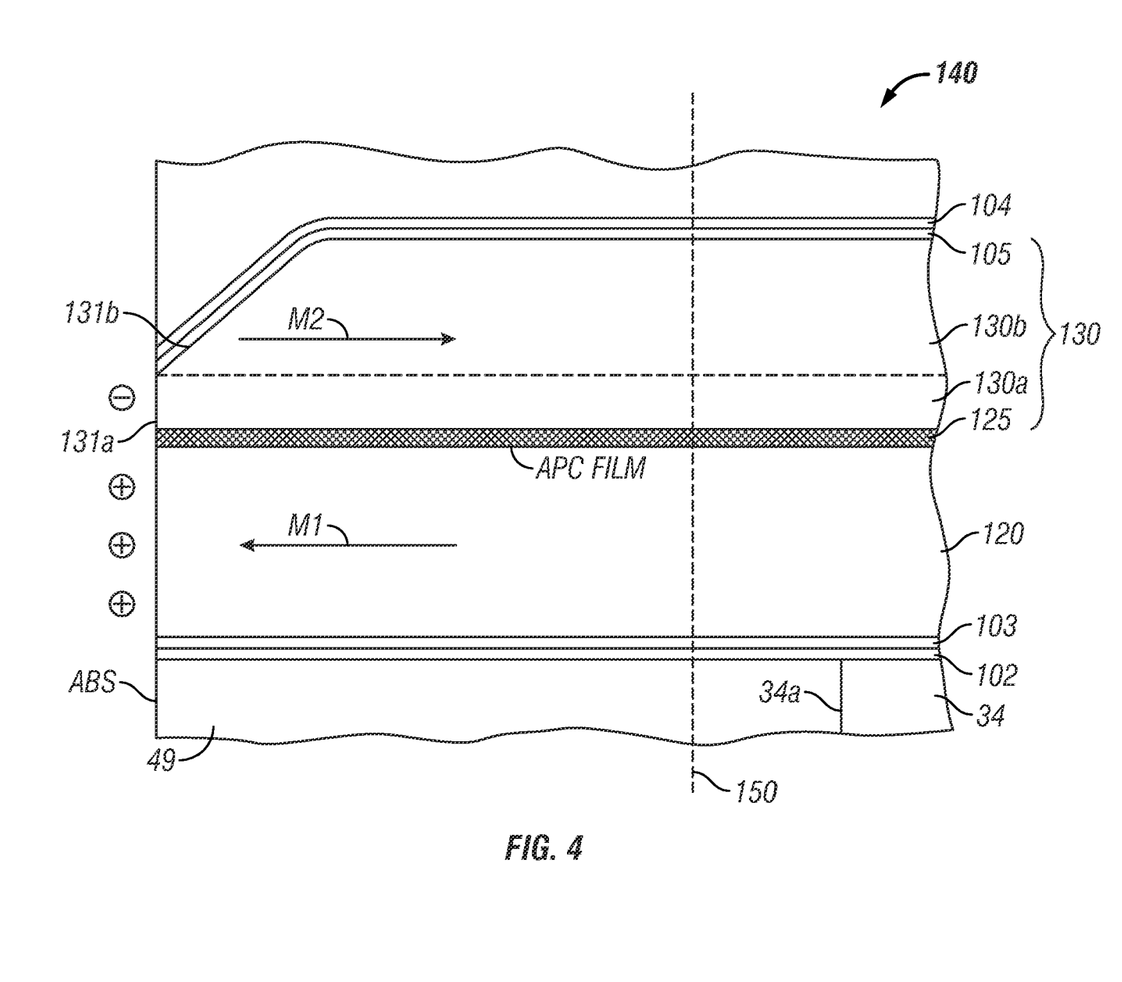
FIG. 4 is an enlarged sectional view of an antiparallel-coupled laminated MP with a tapered trailing edge like that in this invention but with only two ferromagnetic layers and one antiparallel-coupling (APC) layer.

This invention is a write head with an improved antiparallel-coupled laminated MP that has a tapered trailing edge. The trailing edge of the MP is the edge that faces the trailing shield, as shown by MP tip 42 with trailing edge 43a and trailing shield 50 in FIG. 2C. FIG. 4 is an enlarged sectional view of an antiparallel-coupled laminated MP 140 but with a tapered trailing edge like that in this invention and illustrates the problem that arises with the prior art MP of FIG. 3. In FIG. 4, upper ferromagnetic layer 130 has a lower portion 130a with a planar end face 131a at the ABS and an upper portion 130b with a face 131b tapered away from face 131a and the ABS. It is necessary to minimize MP erasure when the write head is in a remanent state, i.e., when the write current to the write coil is off. Therefore it is desirable to have a net flux in the MP be close to zero at the ABS as well as at regions that are recessed form the ABS when the write current is off. Net magnetic flux through any cross-section of the MP is proportional to the net moment from positive and negative charges at the cross section times the area of the cross section. Because the cross-sectional area of end face 131a at the ABS is substantially less than the cross-sectional area of ferromagnetic layer 130 at regions recessed from the tapered face 131b, like at cross-section 150, it is not possible with the antiparallel-coupled structure shown in FIG. 4 to have substantially zero net magnetic flux at both the ABS and regions recessed from the ABS.

Figure 5A:
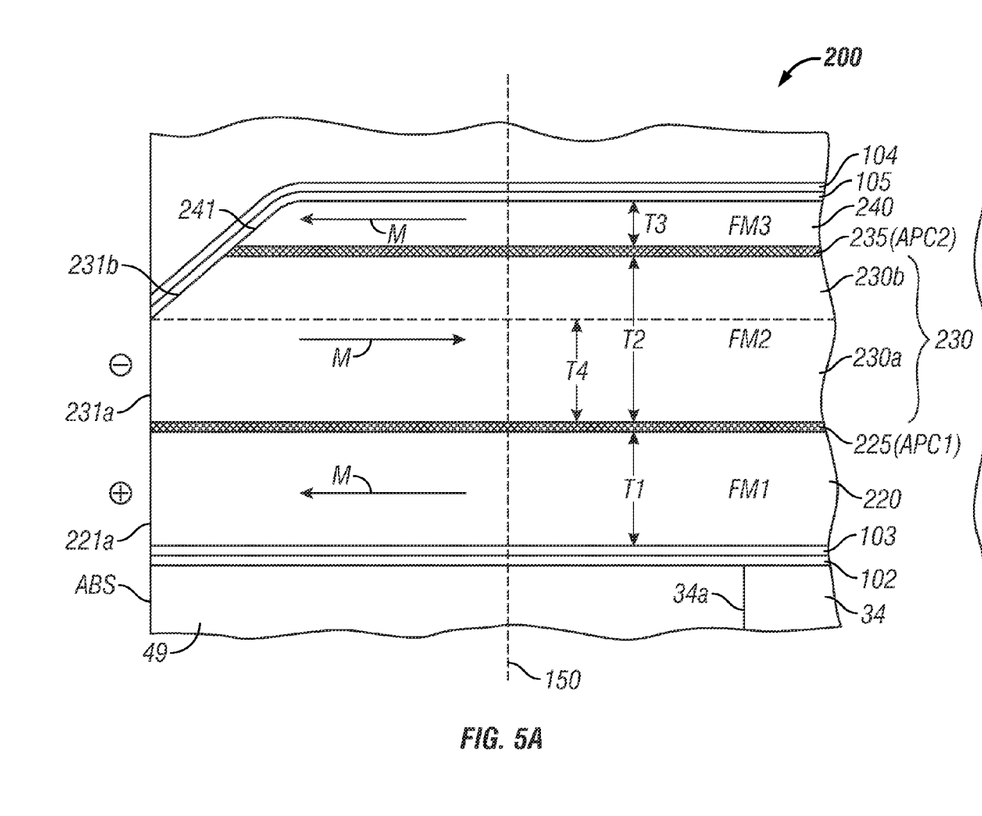
FIG. 5A is an enlarged sectional view of an antiparallel-coupled laminated MP with a tapered trailing edge like that according to the invention, whose end view is depicted in FIG. 5B.
Figure 5B:
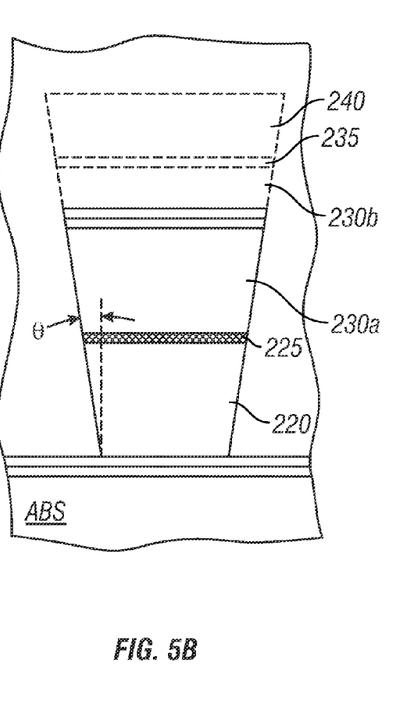
FIG. 5B is an end view of an antiparallel-coupled laminated MP with a tapered trailing edge like that according to the invention and showing the generally trapezoidal shape with bevel angle θ.

FIG. 5A is an enlarged sectional view of an antiparallel-coupled laminated MP 200 with a tapered trailing edge like that according to the invention. FIG. 5B is an end view of the MP 200 showing the generally trapezoidal shape with bevel angle θ. The MP 200 has a first ferromagnetic layer (FM1) 220 having a thickness T1 on the substrate, a second ferromagnetic layer (FM2) 230 having a thickness T2, a first non-magnetic antiparallel-coupling layer (APC1) 225 between FM1 and FM2, a third ferromagnetic layer (FM3) 240 having a thickness T3, and a second non-magnetic antiparallel-coupling layer (APC2) 235 between FM2 and FM3. FM1 has a planar end face 221a coplanar with the ABS. FM2 has a lower portion 230a with a thickness T4 and a planar end face 231a coplanar with end face 221a of FM1, and an upper portion 230b with a tapered end face 231b tapered away from face 231a and the ABS. FM3 has tapered end face 241 coplanar with tapered end face 231b of FM2. The MP 200 thus has three and only three FM layers and two and only two APC layers, wherein the middle ferromagnetic layer, FM2, is split between a lower portion 230a with planar end face 231a at the ABS and an upper portion 230b with a tapered end face 231b not at the ABS. This allows the relative thicknesses of the FM layers, and the thickness T4 of FM2 lower portion 230a, to be selected to minimize pole erasure at both the ABS and regions recessed from the ABS.

Each of APC1 and APC2 is formed of a nonmagnetic metal or metal alloy, such as NiX or NiFeX, where X is selected from Cr, Mo, Cu, Zn, W and Mn; or a stable oxide, such as amorphous MgO, AlOx, HfOx, ZrOx, or SiOx; or a nitride or oxy-nitride. Each of APC1 and APC2 is preferably NiCr with a thickness between 10 and 30 Å, or $Al_2O_3$ with a thickness between 5 and 20 Å. The APC layers should be thick enough to break direct exchange coupling of the ferromagnetic layers, but thin enough to minimize magnetic moment dilution of the MP. The APC layers should induce (110) growth texture for the FeCo alloy, provide reduced or not substantially increase the FeCo grain size, and give a smooth interface and should be free of pinholes.

Each of FM1 FM2 and FM3 is preferably formed of a high-moment alloy comprising Fe and Co with substantially similar compositions, so that the three layers have substantially the same moment M. The composition is preferably of the form $Fe_{100-x}Co_x$, where x is in atomic percent and is preferably between 20 and 45, and more preferably between 25 and 35.

Figure 6:
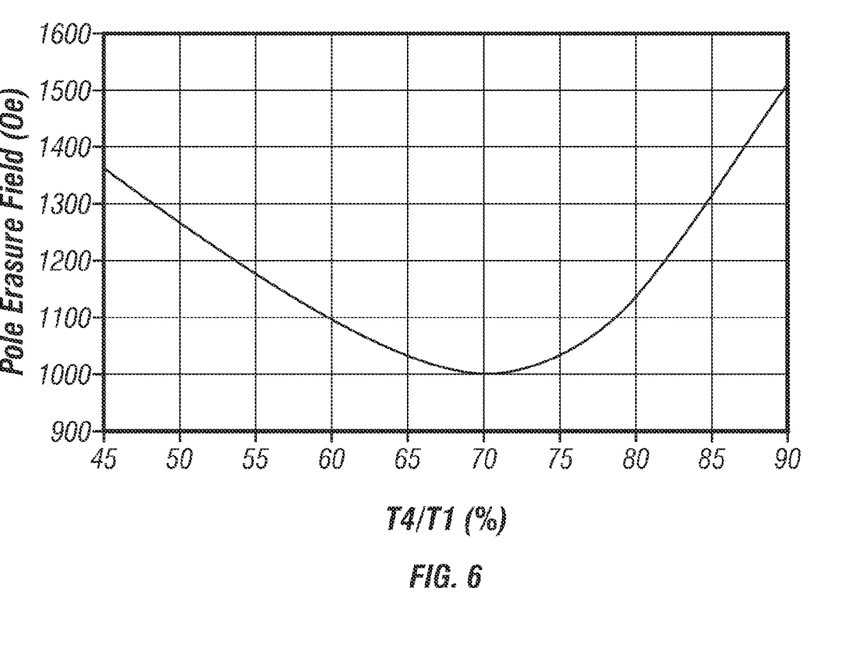
FIG. 6 is a graph of the calculated pole erasure field at the ABS as a function of the ratio of the thickness of the lower portion of second ferromagnetic layer (FM2) to the thickness of first ferromagnetic layer FM1.

The use of only three FM layers and two APC layers, wherein FM2 has both an end portion at the ABS and a tapered end portion, allows the net flux to be minimized at both the ABS and at MP cross-sections recessed from the ABS, like at section 150. The total thickness of the MP, including the three FM and two APC layers, is typically between about 1200-2000 Å, the thickness of the MP portion with ends at the ABS (T1+T4) is typically about 1000 Å, and the typical bevel angle θ is between about 12-18 deg. For a MP with these typical thicknesses and bevel angle, FIG. 6 shows the measured pole erasure field at the ABS as a function of the thickness ratio T4/T1, which is the ratio of the thickness of FM2 lower portion 230a to the thickness of FM1 220, both of which have ends at the ABS. Obviously the desired pole erasure field is zero at the ABS, but T4 cannot equal T1 without causing an undesirable increase in the pole erasure field recessed from the ABS. Assuming 2000 Oe to be the approximate field strength that would cause pole erasure, then T4 should be between about 40-90% T1 to have the erasure field be about 15% less than 2000 Oe. However, because there is a nonmagnetic "gap" at the ABS between FM2 lower portion 230a and FM1 220 due to APC layer 225, there is a reduction in the write field gradient from the MP across the write gap to the trailing shield (the gap between trailing edge 43a and trailing shield 50 in FIG. 2C). Thus to assure a sufficient write field gradient the thickness of T4 should be at least 1.5 times the thickness of the write gap, which is typically about 250 Å, so the lower limit of T4/T1 is limited by the write field gradient to be about 60%. Thus the range of T4/T1 should be between about 60-90%, with the optimal T4/T1 ratio from FIG. 6 being about 70%. Also, as shown by the moments M in FIG. 5A, the moment-area of FM2 should optimally equal the sum of the moment-areas of FM1 and FM3 to minimize the pole erasure field recessed from the ABS, like at section 150 in FIG. 5A. If T2 equals between about 0.80 to 0.95(T1+T3), and T4/T1 is between about 60-90%, this results in a generally balanced moment-area MP with the use of only three FM layers coupled by APC layers. The MP may be designed to have a relatively high bevel angle, e.g. between about 20-35 deg., or a relatively low bevel angle, e.g., between about 4-8 deg. The relative thicknesses of the FM layers may be adjusted accordingly to minimize the pole erasure field at both the ABS and recessed from the ABS. Thus T4/T1 may be between about 60-70% for a high bevel angle, and between about 80-90% for a relatively low bevel angle. The thickness T2, which is preferably between about 0.80 to 0.95(T1+T3), would be adjusted accordingly.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording write head for magnetizing regions of a magnetic recording layer comprising:
 a substrate; and
 a laminated main pole on the substrate and having an end for facing the recording layer, the main pole comprising:
  a first ferromagnetic layer having a thickness T1 on the substrate and comprising Fe and Co, the first ferromagnetic layer having a substantially planar end face;
  a second ferromagnetic layer having a thickness T2 and comprising Fe and Co, the second ferromagnetic layer having a first portion having a substantially planar end face coplanar with the first ferromagnetic layer's end face and a second portion having an end face tapered from said first portion's end face;
  a first non-magnetic antiparallel-coupling (APC) layer between the first and second ferromagnetic layers;
  a third ferromagnetic layer having a thickness T3 and comprising Fe and Co, the third ferromagnetic layer having a tapered end face coplanar with the tapered end face of the second portion of the second ferromagnetic layer; and
  a second non-magnetic antiparallel-coupling (APC) layer between the second and third ferromagnetic layers.

2. The write head of claim 1 wherein the thickness of the first portion of the second ferromagnetic layer is T4 and wherein T4 is greater than or equal to 0.6T1 and less than or equal to 0.9T1.

3. The write head of claim 1 wherein T2 is greater than or equal to 0.8(T1+T3) and less than or equal to 0.95(T1+T3).

4. The write head of claim 1 wherein each of the first and second APC layers is formed of a material selected from a NiCr alloy and $Al_2O_3$.

5. The write head of claim 1 wherein each of the first and second APC layers has a thickness greater than or equal to 10 Å and less than or equal to 30 Å and consists essentially of a NiCr alloy.

6. The write head of claim 1 wherein each of the ferromagnetic layers is formed of a FeCo alloy wherein the amount of Co in said alloy is present in an amount greater than or equal to 20 atomic percent and less than or equal to 45 atomic percent.

7. The write head of claim 1 further comprising a seed layer between the substrate and the first ferromagnetic layer.

8. The write head of claim 7 wherein the seed layer is selected from a Ru layer, a NiCr alloy layer, a NiCr/NiFe alloy bilayer, and a Ru/NiCr alloy bilayer.

9. The write head of claim 1 further comprising a capping layer on the third ferromagnetic layer.

10. The write head of claim 9 wherein the capping layer consists essentially of a NiCr alloy.

11. The write head of claim 1 further comprising an electrically conductive coil for generating magnetic flux in the main pole.

12. A magnetic recording disk drive comprising:
 a rotatable magnetic recording disk comprising a substrate, an underlayer on the substrate, and a perpendicular recording layer on the underlayer; and
 the write head of claim 1.

13. A perpendicular magnetic recording write head for magnetizing regions of a magnetic recording layer comprising:
 a substrate; and
 a laminated main pole on the substrate and having an end for facing the recording layer, the main pole comprising:
  a first ferromagnetic layer having a thickness T1on the substrate and comprising Fe and Co, the first ferromagnetic layer having a substantially planar end face;
  a second ferromagnetic layer having a thickness T2 and comprising Fe and Co, the second ferromagnetic layer having a first portion having a thickness T4 and a substantially planar end face coplanar with the first ferromagnetic layer's end face and a second portion having an end face tapered from said first portion's end face;

a first non-magnetic antiparallel-coupling (APC) layer consisting essentially of an alloy of NiCr between the first and second ferromagnetic layers;

a third ferromagnetic layer having a thickness T3 and comprising Fe and Co, the third ferromagnetic layer having a tapered end face coplanar with the tapered end face of the second portion of the second ferromagnetic layer; and a second non-magnetic antiparallel-coupling (APC) layer consisting essentially of an alloy of NiCr between the second and third ferromagnetic layers; and wherein each of the ferromagnetic layers has substantially the same composition, T4 is greater than or equal to 0.6T1 and less than or equal to 0.9T1, and T2 is greater than or equal to 0.8(T1+T3) and less than or equal to 0.95(T1+T3).

14. The write head of claim 13 wherein each of the first and second APC layers has a thickness greater than or equal to 10 Å and less than or equal to 30 Å.

15. The write head of claim 13 wherein each of the ferromagnetic layers is formed of a FeCo alloy wherein the amount of Co in said alloy is present in an amount greater than or equal to 20 atomic percent and less than or equal to 45 atomic percent.

16. The write head of claim 13 further comprising a seed layer between the substrate and the first ferromagnetic layer.

17. The write head of claim 16 wherein the seed layer is selected from a Ru layer, a NiCr alloy layer, a NiCr/NiFe alloy bilayer, and a Ru/NiCr alloy bilayer.

18. The write head of claim 13 further comprising a capping layer on the third ferromagnetic layer.

19. The write head of claim 18 wherein the capping layer consists essentially of a NiCr alloy.

20. The write head of claim 13 further comprising an electrically conductive coil for generating magnetic flux in the main pole.

* * * * *